US011124166B2

(12) United States Patent
Tanaka et al.

(10) Patent No.: US 11,124,166 B2
(45) Date of Patent: Sep. 21, 2021

(54) VEHICULAR BRAKE SYSTEM

(71) Applicant: HITACHI CONSTRUCTION MACHINERY CO., LTD., Tokyo (JP)

(72) Inventors: Takaaki Tanaka, Tsuchiura (JP);
Takanobu Ikari, Tsuchiura (JP);
Yasutaka Tsuruga, Ryugasaki (JP);
Takayuki Satou, Kashiwa (JP);
Takashi Sasaki, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 279 days.

(21) Appl. No.: 16/330,379

(22) PCT Filed: Sep. 26, 2017

(86) PCT No.: PCT/JP2017/034748
§ 371 (c)(1),
(2) Date: Mar. 5, 2019

(87) PCT Pub. No.: WO2019/064343
PCT Pub. Date: Apr. 4, 2019

(65) Prior Publication Data
US 2020/0189541 A1 Jun. 18, 2020

(51) Int. Cl.
| | |
|---|---|
| *B60T 13/00* | (2006.01) |
| *B60T 11/28* | (2006.01) |
| *B60T 7/12* | (2006.01) |
| *B60T 13/14* | (2006.01) |
| *B60T 17/04* | (2006.01) |

(52) U.S. Cl.
CPC ............... *B60T 11/28* (2013.01); *B60T 7/12* (2013.01); *B60T 13/14* (2013.01); *B60T 17/04* (2013.01)

(58) Field of Classification Search
CPC ... B60T 7/12; B60T 7/22; B60T 13/14; B60T 13/141; B60T 13/148
See application file for complete search history.

(56) References Cited

U.S. PATENT DOCUMENTS

| | | | |
|---|---|---|---|
| 6,824,227 B1 | 11/2004 | Kiesewetter et al. | |
| 8,550,570 B2 * | 10/2013 | Furukawa | B60T 17/18 303/7 |

(Continued)

FOREIGN PATENT DOCUMENTS

| | | |
|---|---|---|
| CN | 101218134 A | 7/2008 |
| CN | 102320300 A | 1/2012 |

(Continued)

OTHER PUBLICATIONS

International Search Report of PCT/JP2017/034748 dated Dec. 26, 2017.

(Continued)

*Primary Examiner* — Nicholas J Lane
(74) *Attorney, Agent, or Firm* — Mattingly & Malur, PC (57) ABSTRACT

A hydraulic oil resupply device (40) is provided between first accumulators (15F, 15R) in a manual braking operation circuit (11) and a second accumulator (25) in an automatic brake circuit (24). The hydraulic oil resupply device (40) resupplies hydraulic oil accumulated in the second accumulator (25) to the first accumulators (15F, 15R) at the operating of a manual braking operation by an operator. This configuration can suppress a rising speed of a brake pressure at the manual operation braking from being slow. Accordingly, in a vehicular brake system, it is possible to enhance a braking capability by the manual braking operation and improve the reliability.

5 Claims, 6 Drawing Sheets

(56) References Cited

U.S. PATENT DOCUMENTS

| | | | |
|---|---|---|---|
| 2009/0112391 A1* | 4/2009 | Uematsu | B60T 10/00 |
| | | | 701/31.4 |
| 2009/0138169 A1* | 5/2009 | Uematsu | B60T 8/176 |
| | | | 701/93 |
| 2011/0246031 A1* | 10/2011 | Uematsu | B60T 8/4809 |
| | | | 701/50 |
| 2011/0257851 A1* | 10/2011 | Uematsu | B60T 8/175 |
| | | | 701/50 |
| 2012/0041651 A1 | 2/2012 | Uematsu et al. | |
| 2018/0208166 A1* | 7/2018 | Eckert | B60T 8/327 |
| 2019/0106093 A1* | 4/2019 | Lemaitre | B60T 7/042 |
| 2020/0010060 A1* | 1/2020 | Tanaka | B60T 7/12 |
| 2020/0055511 A1* | 2/2020 | Schwagmeyer | B60T 8/1708 |
| 2020/0182262 A1* | 6/2020 | Blackwell | F15B 21/044 |

FOREIGN PATENT DOCUMENTS

| | | |
|---|---|---|
| CN | 202491793 U | 10/2012 |
| EP | 2 724 903 A2 | 4/2014 |
| JP | 03-007653 A | 1/1991 |
| JP | 08-268256 A | 10/1996 |
| JP | 2003-503278 A | 1/2003 |
| JP | 2014-111407 A | 6/2014 |

OTHER PUBLICATIONS

Chinese Office Action received in corresponding Chinese Application No. 201780054840.8 dated Apr. 15, 2021.

\* cited by examiner

VEHICULAR BRAKE SYSTEM

TECHNICAL FIELD

The present invention relates to a vehicular brake system that is used in transporting crushed stones excavated in a mine, for example.

BACKGROUND ART

In general, in a case where an operator drives a dump truck as a large-sized vehicle, since labor costs thereof are high, an automatic driving of a dump truck making the operator unnecessary is performed. In the dump truck that performs the automatic driving, it is required to automatically perform a brake, deceleration and stop of a vehicle. Therefore, there is proposed a system provided with an automatic brake circuit for use in such a dump truck. In addition, as disclosed in Patent Document 1, there is known also a brake system in which a manned brake circuit (manual braking operation circuit) and an automatic brake circuit both are provided together.

According to the conventional brake system, for example, in a case where the automatic driving of the dump truck is made impossible due to troubles, an operator can drive the dump truck. Also, at the maintenance time of a vehicle, an operator can drive the dump truck. A brake is made operable by an operation of the operator, making it possible to carry out a brake of the dump truck. On the other hand, when the dump truck is automatically driven, the brake is automatically made operable in response to a control signal from a controller, enabling the automatic braking of the dump truck to be performed.

PRIOR ART DOCUMENT

Patent Document

Patent Document 1: EP Patent Laid-Open Publication No. 2724903 A

SUMMARY OF THE INVENTION

However, a problem as follows occurs in the conventional technology. That is, in the brake system in the conventional technology, the manual braking operation circuit and the automatic brake circuit are connected in parallel through a high-pressure selection valve (shuttle valve). Consequently, the structure of the brake line arrangement becomes complicated, increasing a pressure loss in the halfway of the line arrangement by joints or the shuttle valve. Therefore, in a case where an operator generates a braking force by the manual braking operation, a large pressure loss occurs in the halfway of the brake line arrangement, slowing a rising speed of a brake pressure. As a result, there is posed a problem that it takes time to sufficiently increase the braking force by the manual braking operation, causing a brake distance of a vehicle to be longer.

The present invention is made in view of the problems in the conventional technology as described above, and an object of the present invention is to provide a vehicular brake system that can enhance a braking capability and improve reliability thereof.

For solving the aforementioned problems, the present invention is applied to a vehicular brake system comprising: a hydraulic pump that is driven by an engine mounted on a vehicle chassis to deliver hydraulic oil; a plurality of brake devices that apply braking forces to the vehicle chassis by the delivery of the hydraulic oil; a manual braking operation circuit in which an operator performs an operation of the brake device; and an automatic brake circuit in which the operation of the brake device is performed not through the operator, the manual braking operation circuit including: at least one first accumulator that accumulates the hydraulic oil to be delivered from the hydraulic pump; and at least one first brake valve that controls supply or discharge of the hydraulic oil toward the brake device from the first accumulator by a pedal operation, and the automatic brake circuit including: at least one second accumulator that accumulates the hydraulic oil to be delivered from the hydraulic pump; at least one second brake valve that controls supply or discharge of the hydraulic oil toward the brake device from the second accumulator; a control device that controls an operation of the second brake valve; and at least one brake pressure selection device that selects hydraulic oil higher in pressure out of the hydraulic oils to be supplied from the first brake valve and the second brake valve and outputs the higher hydraulic oil to the brake device.

The configuration adopted by the present invention is characterized in that: at least one hydraulic oil resupply device is provided between the first accumulator in the manual braking operation circuit and the second accumulator in the automatic brake circuit, and the hydraulic oil resupply device resupplies the hydraulic oil accumulated in the second accumulator to the first accumulator.

With the aforementioned configuration, in a case of performing the brake of the vehicle by operating the manual braking operation circuit, the hydraulic oil can be supplied from the second accumulator in the automatic brake circuit to the first accumulator in the manual braking operation circuit to substantially increase a capacity of the first accumulator. Therefore, it is possible to suppress a rising speed of the brake pressure at the manual braking operation from being slower due to a pressure loss element added to the line arrangement route in the brake system (for example, brake pressure selection device). This can increase the braking force in such a manner that a brake distance of the vehicle becomes shorter, making it possible to improve the reliability of the brake system.

MODE FOR CARRYING OUT THE INVENTION

Hereinafter, a vehicular brake system according to an embodiment of the present invention will be in detail explained with reference to the accompanying drawings, by taking a case of being applied to a brake system in a dump truck as an example.

Figure 1:
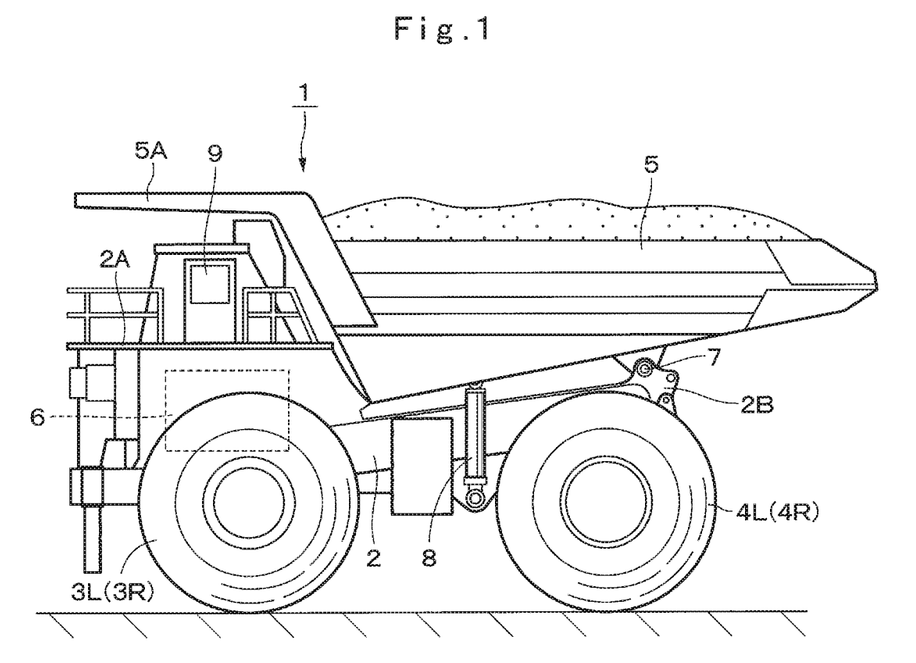
FIG. 1 is a front view showing a dump truck on which a brake system according to an embodiment in the present invention is mounted.

Here, FIG. 1 to FIG. 6 show a first embodiment. In FIG. 1, a dump truck 1 is a large-sized vehicle that transports transport objects such as crushed stones or sand and earth excavated in a mine, for example. The dump truck 1 includes a vehicle chassis 2 having a rigid frame structure, left and right front wheels 3L, 3R and left and right rear wheels 4L, 4R provided in a lower part of the vehicle chassis 2 and a vessel 5 that is in a rear part upper side of the vehicle chassis 2 and loads cargo of sand and earth or the like. A deck part 2A as a flat floor plate is provided in a front side of the vehicle chassis 2. An engine 6 as a prime mover is positioned under the deck part 2A to be mounted on the vehicle chassis 2. The vessel 5 is attached in a bracket 2B of the vehicle chassis 2 to be capable of tilting (lifting) thereon using a hinge pin 7. A hoist cylinders 8 extending in an upper-lower direction is provided between the vehicle chassis 2 and a lower part of the vessel 5.

A cab 9 is provided in the front side of the vehicle chassis 2 to be positioned under the lower side of a protector 5A in the vessel 5. The cab 9 is provided on the deck part 2A disposed in the front side of the vehicle chassis 2. The cab 9 forms an operator's cab which an operator (driver) of the dump truck 1 gets in and out of, and an operator's seat, an accelerator pedal, a hoist lever, a steering handle and an automatic steering motor (any of them is not shown), and a brake pedal 23 to be described later are arranged in the inside of the operator's cab.

In addition, a manual braking operation circuit 11, an automatic brake circuit 24, a controller 39 and a hoist valve (unillustrated) that controls an operation of the hoist cylinders 8, which will be described later, and the like are mounted on the dump truck 1. The controller 39 performs a rotational speed control of the engine 6, and also performs control of the automatic brake circuit 24. The controller 39 controls an automatic steering motor, the hoist valve and the like, and performs automatic steering of the dump truck 1, an expansion control of the hoist cylinders 8 and the like.

Next, an explanation will be made of the brake system according to the first embodiment that is mounted on the dump truck 1 with reference to FIG. 2.

Figure 2:
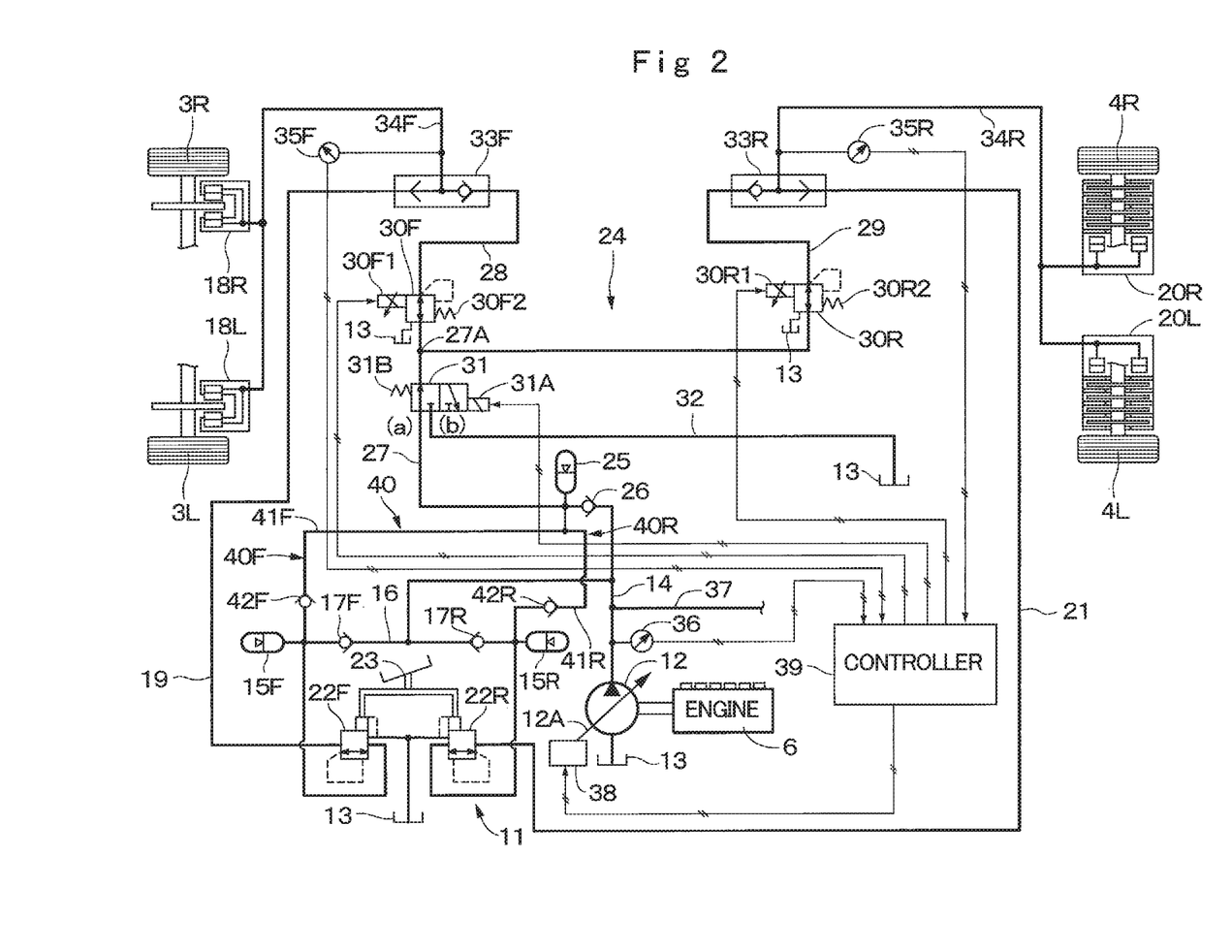
FIG. 2 is a control circuit diagram showing a brake system according to a first embodiment.

As shown in FIG. 2, the brake system according to the first embodiment includes the manual braking operation circuit 11, which will be described later, corresponding to a manned driving in which an operator drives the dump truck 1, and the automatic brake circuit 24, which will be described later, corresponding to an automatic driving in which the dump truck 1 is automatically driven in a state where an operator is not on the dump truck 1.

The manual braking operation circuit 11 is a brake circuit for performing a brake of the dump truck 1 by a brake operation of an operator. The manual braking operation circuit 11 includes a hydraulic pump 12, first accumulators 15F, 15R, front brakes 18L, 18R, rear brakes 20L, 20R, first brake valves 22F, 22R, a brake pedal 23, which will be described later, and the like.

The hydraulic pump 12 configures a hydraulic source together with a tank 13. The hydraulic pump 12 suctions hydraulic oil reserved in the tank 13 by being driven by the engine 6, and delivers the suctioned hydraulic oil to a pump line 14 as a high-pressure hydraulic oil. The high-pressure hydraulic oil (hereinafter, called pressurized oil) is accumulated in the front first accumulator 15F and in the rear first accumulator 15R respectively. The pressurized oil accumulated in this manner is supplied to, for example, the left and right front brakes 18L, 18R and the left and right rear brakes 20L, 20R. It should be noted that the pump line 14 connecting the first accumulator line 16 and the hydraulic pump 12 has the maximum pressure that is set by a relief valve (not shown). Therefore, an accumulation value (pressure) of each of the accumulators 15F, 15R is suppressed to a pressure equal to or less than a setting pressure (the above maximum pressure) of the relief valve. The hydraulic pump 12 is configured of a variable displacement pump that is driven by the engine 6 and has a displacement variable part 12A.

The front first accumulator 15F and the rear first accumulator 15R (that is, the first accumulators 15F, 15R) are connected in parallel to the pump line 14 through a first accumulator line 16. The front first accumulator 15F accumulates therein the pressurized oil for supply to the left and right front brakes 18L, 18R. The front first accumulator 15F configures a pressurized oil supply source to the left and right front brakes 18L, 18R. The rear first accumulator 15R accumulates therein the pressurized oil for supply to the left and right rear brakes 20L, 20R. The rear first accumulator 15R configures a pressurized oil supply source to the left and right rear brakes 20L, 20R.

A front side check valve 17F and a rear side check valve 17R are connected in parallel to the pump line 14 through the first accumulator line 16. The front side check valve 17F is a one-way valve allowing a flow of the pressurized oil from the hydraulic pump 12 toward the front first accumulator 15F and blocking a reverse flow of the pressurized oil. The rear side check valve 17R is a one-way valve allowing a flow of the pressurized oil from the hydraulic pump 12 toward the rear first accumulator 15R and blocking a reverse flow of the pressurized oil. Consequently, the pressure (accumulation value) in each of the first accumulators 15F, 15R does not go below the pressure in the pump line 14, and is kept in a pressure equal to or more than the pressure in the pump line 14 and equal to or less than the setting pressure of the relief valve. The accumulation value of each of the accumulators 15F, 15R is set to a high-pressure value Pbmax shown in FIG. 6, for example.

The left and right front brakes 18L, 18R and the left and right rear brakes 20L, 20R configure a break device that applies braking forces to the vehicle chassis 2 of the dump truck 1. Among them, the left side front brake 18L is provided in the left front wheel 3L and the right side front brake 18R is provided in the right front wheel 3R. The left and right front brakes 18L, 18R each are configured of a disc brake, for example. The left and right front brakes 18L, 18R are connected to the front first accumulator 15F by a front side first line 19. More specifically, the left and right front brakes 18L, 18R are connected to a shuttle valve 33F through a front side brake line 34F to be described later. One input side of the shuttle valve 33F is connected to the front first accumulator 15F through the first brake valve 22F and the front side first line 19.

The pressurized oil is supplied from the front first accumulator 15F through the front side first brake valve 22F, the front side first line 19, the shuttle valve 33F and the front side brake line 34F to the left and right front brakes 18L, 18R in response to a depression operation of the brake pedal 23. Consequently, the left and right front brakes 18L, 18R apply braking forces to the left and right front wheels 3L, 3R respectively.

The left side rear brake 20L is provided in the left rear wheel 4L and the right side rear brake 20R is provided in the right rear wheel 4R. The left and right rear brakes 20L, 20R each are configured of a wet multiple disc brake, for example. The left and right rear brakes 20L, 20R are connected to the rear first accumulator 15R by a rear side first line 21. More specifically the left and right rear brakes 20L, 20R are connected to a shuttle valve 33R through a rear side brake line 34R to be described later. One input side of the shuttle valve 33R is connected to the rear first accumulator 15R through the first brake valve 22R and the rear side first line 21.

The pressurized oil is supplied from the rear first accumulator 15R through the rear side brake valve 22R, the rear side first line 21, the shuttle valve 33R and the rear side brake line 34R to the left and right rear brakes 20L, 20R in response to a depression operation of the brake pedal 23. Consequently, the left and right rear brakes 20L, 20R apply braking forces to the left and right rear wheels 4L, 4R respectively.

The front side first brake valve 22F is positioned between the front first accumulator 15F and the left and right front brakes 18L, 18R and is provided in the halfway of the front side first line 19. The rear side first brake valve 22R is positioned between the rear first accumulator 15R and the left and right rear brakes 20L, 20R and is provided in the halfway of the rear side first line 21. The first brake valves 22F, 22R each are configured by a pressure reducing valve a setting pressure of which is variably adjusted in response to an operation quantity of the brake pedal 23. The first brake valves 22F, 22R control supply or discharge of the pressurized oil (hydraulic oil) from the first accumulators 15F, 15R toward the brake device (that is, the front brakes 18L, 18R and the left and right rear brakes 20L, 20R) by a pedal operation.

The front side first brake valve 22F controls a pressure of the pressurized oil that is supplied from the front first accumulator 15F through the front side first line 19 to the left and right front brakes 18L, 18R in response to a depression operation quantity of the brake pedal 23. The rear side first brake valve 22R controls a pressure of the pressurized oil that is supplied from the rear first accumulator 15R through the rear side first line 21 to the left and right rear brakes 20L, 20R in response to a depression operation quantity of the brake pedal 23.

The brake pedal 23 is provided in the cab 9 of the dump truck 1. The brake pedal 23 is depressed by an operator at the manned driving of the dump truck 1 to generate braking forces in a vehicle. A pressure of the pressurized oil that is outputted from the first brake valves 22F, 22R is variably adjusted in response to a depression operation quantity of the brake pedal 23. The pressurized oil a brake pressure of which is adjusted is supplied to the left and right front brakes 18L, 18R and the left and right rear brakes 20L, 20R. Accordingly, in a case of performing a brake of the dump truck 1 by the manual braking operation circuit 11, an operator increases or decreases a depression operation quantity (operation angle) of the brake pedal 23. Consequently, the braking force generated in each of the left and right front brakes 18L, 18R and the left and right rear brakes 20L, 20R is variably adjusted in response to the depression operation quantity.

Next, the automatic brake circuit 24 is a brake circuit for automatically performing a brake to the vehicle chassis 2 of the dump truck 1 not through an operator (that is, not depending upon an operation of an operator). The automatic brake circuit 24 includes the hydraulic pump 12, the left and right front brakes 18L, 18R, the left and right rear brakes 20L, 20R, a second accumulator 25, second brake valves 30F, 30R a directional control valve 31, the shuttle valves 33F, 33R, pressure sensors 35F, 35R and the controller 39 as the control device.

The second accumulator 25 in the automatic brake circuit 24 is connected to the pump line 14 through a check valve 26. The second accumulator 25 accumulates the brake pressure (pressurized oil) in the automatic brake circuit 24. The second accumulator 25 supplies brake pressures to the left and right front brakes 18L, 18R and the left and right rear brakes 20L, 20R. The second accumulator 25 configures a pressurized oil supply source in common to the left and right front brakes 18L, 18R and the left and right rear brakes 20L, 20R.

The check valve 26 is a one-way valve that allows a flow of the pressurized oil from the hydraulic pump 12 through the pump line 14 toward the second accumulator 25 and blocks a reverse flow (a flow of the pressurized oil from the second accumulator 25 toward the hydraulic pump 12). With this check valve 26, the pressure (accumulation value) in the second accumulator 25 does not go below the pressure in the pump line 14, and is kept to be a pressure equal to or more than the pressure in the pump line 14 and equal to or less than a setting pressure of the relief valve.

A second line 27 is a conduit for branching the second accumulator 25 into the left and right front brakes 18L, 18R and the left and right rear brakes 20L, 20R for connection. The second line 27 is branched into a front side second line 28 and a rear side second line 29 in a position of a branch point 27A. The front side second line 28 is a conduit for supplying a brake pressure (pressurized oil) from the second accumulator 25 through the second line 27 to the front brakes 18L, 18R. The rear side second line 29 is a conduit for supplying a brake pressure (pressurized oil) from the second accumulator 25 through the second line 27 to the rear brakes 20L, 20R.

The front side second brake valve 30F is positioned between the branch point 27A of the second line 27 and the front brakes 18L, 18R and is provided in the halfway of the front side second line 28. The second brake valve 30F is configured by an electromagnetic proportional pressure reducing valve of a normally open type having an electromagnetic proportional solenoid part 30F1 and a spring 30F2, for example. The second brake valve 30F is disposed in a valve open position as shown in FIG. 2 by the spring 30F2 in a non-powered state in which a control signal (operation signal) is not supplied to the electromagnetic proportional solenoid part 30F1 from the controller 39 to make the front side second line 28 be communicated with the second line 27 (second accumulator 25). At this time, the pressurized oil (brake pressure) accumulated in the second accumulator 25 is supplied to the front brakes 18L, 18R through the second line 27, the second brake valve 30F and the front side second line 28 to apply the braking force to the left and right front wheels 3L, 3R.

When a control signal is outputted to the electromagnetic proportional solenoid part 30F1 from the controller 39, the front side second brake valve 30F is controlled and switched in such a manner that the front side second line 28 is gradually communicated with the tank 13-side in proportion to a current value of the control signal. Therefore, the pressure in the front side second line 28 gradually reduces in proportion to the current value of the control signal. Consequently, the pressure of the pressurized oil that is supplied to each of the left and right front brakes 18L, 18R through the second accumulator 25 to the front side second line 28 gradually reduces in proportion to the current value of the control signal. Therefore, the front brakes 18L, 18R are controlled to reduce and release the braking force to the vehicle. When the current value of the control signal is further increased, the front side second brake valve 30F is in full communication with the tank 13, and the braking forces by the left and right front brakes 18L, 18R are released.

The rear side second brake valve 30R is positioned between the branch point 27A of the second line 27 and the left and right rear brakes 20L, 20R and is provided in the halfway of the rear side second line 29. The second brake valve 30R is configured by an electromagnetic pressure reducing valve of a normally open type having an electromagnetic proportional solenoid part 30R1 and a spring 30R2, for example. The rear side second brake valve 30R is also, as similar to the aforementioned front side second brake valve 30F, controlled and switched in proportion to a current value of a control signal to be supplied to the electromagnetic proportional solenoid part 30R1 from the controller 39. Supply of the pressurized oil (brake pressure) accumulated in the second accumulator 25 is made or stopped to the rear brakes 20L, 20R through the second line 27, the second brake valve 30R and the rear side second line 29 to apply or release the braking force of each of the left and right rear wheels 4L, 4R.

A directional control valve 31 is an electromagnetic directional control valve that is provided between the second accumulator 25 in the automatic brake circuit 24 and the second brake valves 30F, 30R. The directional control valve 31 is positioned between the branch point 27A of the second line 27 and the second accumulator 25 and is provided in the halfway of the second line 27. The directional control valve 31 is configured by an electromagnetic valve of a normally open type having a solenoid part 31A and a spring 31B in a three-port and two-position type, for example.

The directional control valve 31 is disposed in a communicating position (a) of being communicated with the second accumulator 25 by a spring 31B in a non-powered state in which a control signal is not outputted to the solenoid part 31A from the controller 39. The directional control valve 31 allows the pressurized oil (hydraulic oil) to flow from the second accumulator 25 toward the second brake valves 30F, 30R in this communicating position (a). On the other hand, the directional control valve 31 is switched against the spring 31B from the communicating position (a) to a tank position (b) by a control signal from the controller 39.

Figure 3:
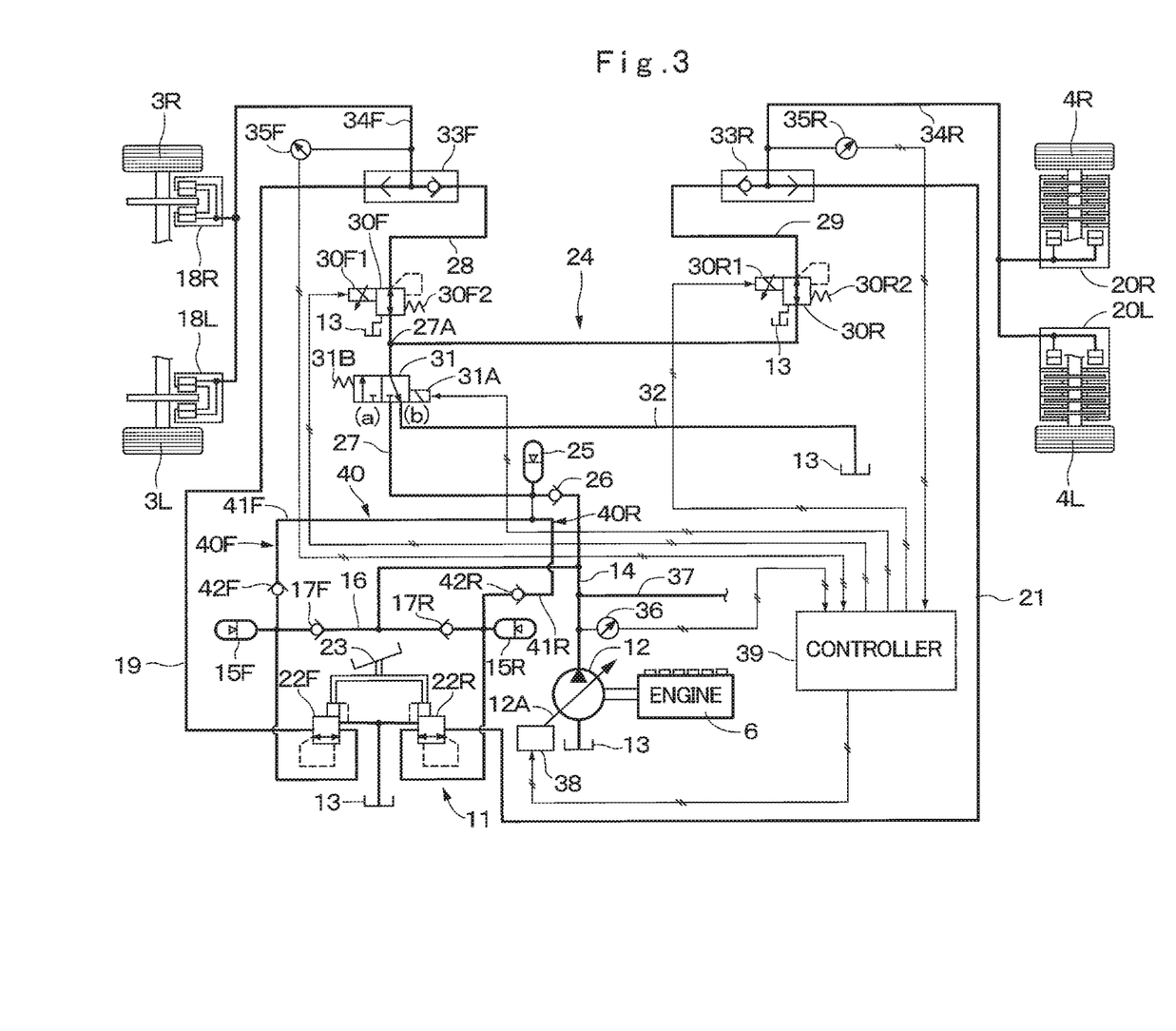
FIG. 3 is the control circuit diagram showing a state where a control switching valve is switched from a communicating position to a tank position in the brake system in FIG. 2.

As shown in FIG. 3, when the directional control valve 31 is switched to the tank position (b), the second brake valves 30F, 30R are blocked from the second accumulator 25 to be communicated with a tank line 32. Therefore, the second brake valves 30F, 30R are communicated with the tank 13 through the tank line 32, and the pressure in each of the front side and rear side second lines 28, 29 is reduced to a tank pressure. At this time, the automatic brake circuit 24 releases the braking forces by the front brakes 18L, 18R and the rear brakes 20L, 20R to enable the dump truck 1 to travel.

The front side shuttle valve 33F and the rear side shuttle valve 33R each are a brake pressure selection device (high-pressure selection valve) that selects a brake pressure higher in pressure out of the manual braking operation circuit 11 and the automatic brake circuit 24. In other words, the manual braking operation circuit 11 and the automatic brake circuit 24 are connected in parallel to the front brakes 18L, 18R and the rear brakes 20L, 20R through the shuttle valves 33F, 33R.

The front side shuttle valve 33F selects the pressurized oil higher in pressure out of the pressurized oils (hydraulic oils) to be supplied from the front side first line 19 (first brake valve 22F) and the front side second line 28 (second brake valve 30F). The selected pressurized oil is supplied (outputted) to the left and right front brakes 18L, 18R as a brake pressure through the front side brake line 34F. The rear side shuttle valve 33R selects the pressurized oil higher in pressure out of the pressurized oils (hydraulic oils) to be supplied from the rear side first line 21 (first brake valve 22R) and the rear side second line 29 (second brake valve 30R). The selected pressurized oil is supplied (outputted) to the left and right rear brakes 20L, 20R as a brake pressure through the rear side brake line 34R.

The front side pressure sensor 35F as a pressure detector is positioned between the front brakes 18L, 18R and the shuttle valve 33F and is provided in the halfway of the front side brake line 34F. The pressure sensor 35F detects a brake pressure (pressure of the pressurized oil) supplied to the left and right front brakes 18L, 18R from the front side brake line 34F and outputs the detection signal to the controller 39.

The rear side pressure sensor 35R as a pressure detector is positioned between the rear brakes 20L, 20R and the shuttle valve 33R and is provided in the halfway of the rear side brake line 34R. The pressure sensor 35R detects a brake pressure (pressure of the pressurized oil) supplied to the left and right rear brakes 20L, 20R from the rear side brake line 34R and outputs the detection signal to the controller 39.

The other pressure sensor 36 is a pump delivery pressure detector that detects a pressure in the pump line 14 as a delivery pressure of the hydraulic pump 12. The pressure sensor 36 detects the lowest pressure out of the pressures (accumulation values) of the pressurized oils accumulated in the first accumulators 15F, 15R and the second accumulator 25 as a pressure in the pump line 14. The pressure in the pump line 14 is set as the lowest pressure value out of the accumulation values (pressures) of the accumulators 15F, 15R, 25 by the check valves 17F, 17R, 26. The pressure sensor 36 detects a delivery pressure of the hydraulic pump 12 equivalent to the accumulation value and outputs the detection signal to the controller 39 to be described later.

A branch line 37 is provided in the halfway of the pump line 14. The branch line 37 is a conduit that supplies the pressurized oil delivered from the hydraulic pump 12 to a hydraulic actuator (for example, a hydraulic actuator for an unillustrated power steering or the like) other than the brake circuits 11, 24. It should be noted that an excess pressure of the pressurized oil in each of the pump line 14 and the branch line 37 is relieved to the tank 13 by the relief valve (not shown). The maximum pressure of the pressure in each of the pump line 14 and the branch line 37 is set by the relief valve that suppresses the excess pressure from acting on the hydraulic pump 12. Therefore, the accumulation value (pressure) of each of the accumulators 15F, 15R, 25 is suppressed to a pressure equal to or less than the setting pressure (the maximum pressure) of the relief valve.

A regulator 38 for displacement control is attached to the hydraulic pump 12 in a variable displacement type. The regulator 38 configures part of a displacement variable actuator of the hydraulic pump 12. The regulator 38 drives to tilt the displacement variable part 12A of the hydraulic pump 12 in response to a control signal outputted from the controller 39 (control device) to be described later. Consequently, a delivery displacement (pushed displacement) of the hydraulic pump 12 is variably controlled. When the displacement variable part 12A is driven to be tilted to the minimum tilting position by the regulator 38, the delivery quantity of the hydraulic pump 12 amounts to the minimum flow quantity. At this time, a load of the engine 6 can be suppressed to be small. When the displacement variable part 12A is driven to be tilted to the maximum tilting position, the delivery quantity of the hydraulic pump 12 amounts to the maximum flow quantity. At this time, a load of the engine 6 can be largely increased. The regulator 38 is configured of, for example, an electromagnetic actuator of a solenoid or the like or a hydraulic actuator.

The controller 39 as the control device is mounted on the vehicle chassis 2 of the dump truck 1. The controller 39 has an input side to which the pressure sensors 35F, 35R, 36 and the like are connected. The controller 39 has an output side to which the electromagnetic proportional solenoid parts 30F1, 30R1 of the second brake valves 30F, 30R, the solenoid part 31A of the directional control valve 31, the regulator 38 and the like are connected.

The controller 39 determines operating states of the second brake valves 30F, 30R based upon control signals to the second brake valves 30F, 30R, a control signal to the directional control valve 31 and detection signals from the pressure sensors 35F, 35R. The controller 39 performs control of switching the directional control valve 31 to any one of the communicating position (a) and the tank position (b) depending upon whether or not the second brake valves 30F, 30R are normally operated.

The controller 39 controls a drive of the regulator 38 in accordance with the delivery pressure of the hydraulic pump 12 detected by the pressure sensor 36. Consequently, the displacement variable part 12A of the hydraulic pump 12 is driven to be tilted by the regulator 38, and the delivery quantity of the pressurized oil thereof is variably controlled in accordance with the delivery pressure. The delivery pressure at this time becomes equal to a pressure (that is, an accumulation value) of the pressurized oil accumulated in each of the first accumulators 15F, 15R and the second accumulator 25.

That is, when the accumulation value goes beyond a predetermined high-pressure value (higher threshold value), the regulator 38 drives the displacement variable part 12A to the minimum tilting position, for example, in such a manner as to reduce the delivery quantity of the hydraulic pump 12 by the control signal from the controller 39. Accordingly, it is possible to reduce a flow quantity of extra pressurized oil to be exhausted to the tank 13 from the relief valve. On the other hand, when the pressure (accumulation value) of the pressurized oil accumulated in each of the first accumulators 15F, 15R or the second accumulator 25 is lowered to a predetermined low value (lower threshold value), the regulator 38 drives the displacement variable part 12A to the maximum tilting position, for example, in such a manner as to gradually increase the delivery quantity of the hydraulic pump 12 by the control signal from the controller 39. Accordingly, the accumulation value (pressure) of each of the accumulators 15F, 15R, 25 is gradually increased.

A hydraulic oil resupply device 40 is configured by a front hydraulic oil resupply device 40F provided between the front first accumulator 15F in the manual braking operation circuit 11 and the second accumulator 25 in the automatic brake circuit 24, and a rear hydraulic oil resupply device 40R provided between the rear first accumulator 15R in the manual braking operation circuit 11 and the second accumulator 25. The front hydraulic oil resupply device 40F is configured by a connecting line 41F and a resupply control valve 42F for resupply of the pressurized oil (hydraulic oil) accumulated in the second accumulator 25 to the front first accumulator 15F.

The connecting line 41F of the front hydraulic oil resupply device 40F is a conduit that establishes connection between the first accumulator 15F and the second accumulator 25. The resupply control valve 42F is a one-way valve provided in the halfway in the connecting line 41F, for example. The resupply control valve 42F allows the pressurized oil to flow from the second accumulator 25 toward the first accumulator 15F in the connecting line 41F, and blocks a reverse flow of the hydraulic oil.

The rear hydraulic oil resupply device 40R is configured by the connecting line 41R and a resupply control valve 42R for resupply of the pressurized oil accumulated in the second accumulator 25 to the rear first accumulator 15R. The connecting line 41R of the rear hydraulic oil resupply device 40R is provided in parallel with the connecting line 41F to the second accumulator 25, and establishes connection between the first accumulator 15R and the second accumulator 25. The resupply control valve 42R is a one-way valve provided in the halfway of the connecting line 41R, for example. The resupply control valve 42R allows the pressurized oil to flow from the second accumulator 25 toward the first accumulator 15R in the connecting line 41R, and blocks a reverse flow of the hydraulic oil.

The brake system of the dump truck 1 according to the first embodiment has the configuration as described above, and next, an explanation will be made of operations at the manned driving and at the automatic driving of the dump truck 1.

An explanation will be made of the manned driving in which an operator drives the dump truck 1.

In a case of the manned driving, for example, as shown in FIG. 3 the directional control valve 31 is switched to the tank position (b), and the pressure in each of the front side and rear side second lines 28, 29 is reduced to the tank pressure. Therefore, the automatic brake circuit 24 releases the braking forces by the front brakes 18L, 18R and the rear brakes 20L, 20R to enable the dump truck 1 to travel.

At the manned driving, in a case of braking the dump truck 1 by the manual braking operation circuit 11, an operator performs a depression operation of the brake pedal 23. For example, as shown in a characteristic line 43 in FIG. 4, a pressure Pbx of the pressurized oil to be outputted through the first brake valves 22F, 22R from the first accumulators 15F, 15R increases in response to an increase in a depression operation quantity (operation angle) θbx of the brake pedal 23 by an operator. At this time, when the operation angle θbx of the brake pedal 23 becomes an optional angle θb1, the pressure Pbx of the pressurized oil amounts to a pressure Pb1.

Figure 4:
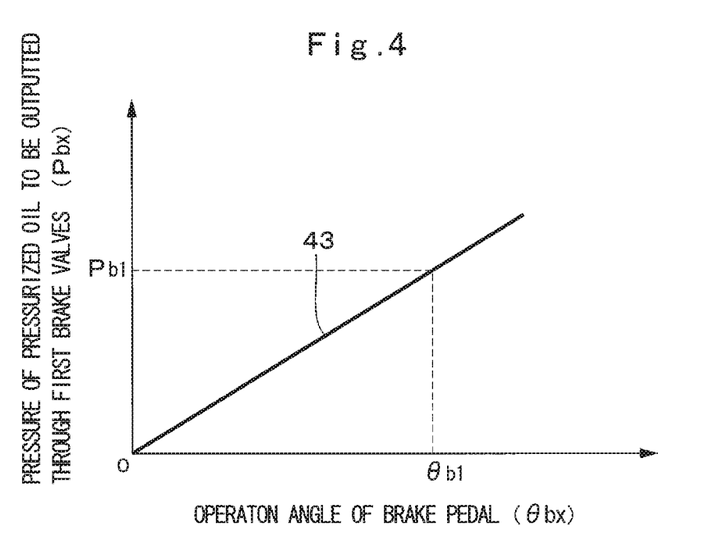
FIG. 4 is a characteristic line diagram showing a relation between an operation angle of a brake pedal and a pressure of hydraulic oil to be outputted from a first brake valve.

In this way, the pressure Pbx of the pressurized oil to be outputted through the first brake valves 22F, 22R from the first accumulators 15F, 15R changes in accordance with the depression operation quantity θbx of the brake pedal 23. The pressurized oil at this time becomes the brake pressure of the pressure Pbx, which will be supplied to the left and right front brakes 18L, 18R and the left and right rear brakes 20L, 20R respectively.

Figure 5:
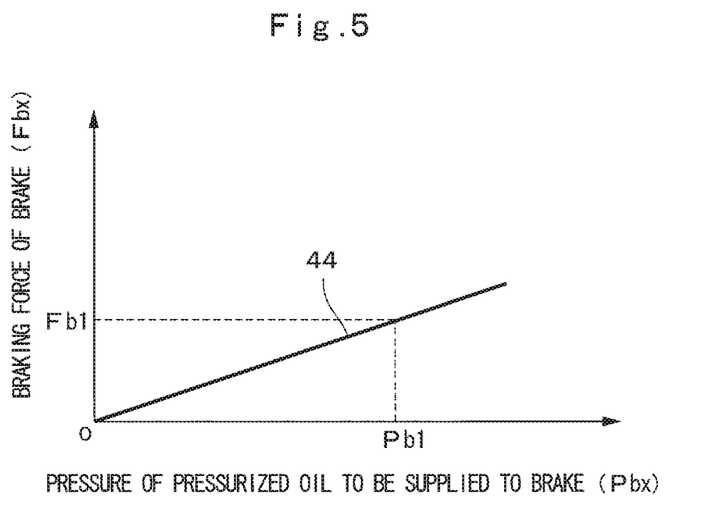
FIG. 5 is a characteristic line diagram showing a relation between a pressure of hydraulic oil to be supplied to a brake and a braking force of the brake.

A characteristic line 44 as shown in FIG. 5 shows a relation between a pressure Pbx of pressurized oil to be supplied to a brake and a braking force Fbx of a brake. A braking force Fbx by each of the left and right front brakes 18L, 18R and the left and right rear brakes 20L, 20R increases in response to an increase in a pressure Pbx of pressurized oil to be supplied to each of the left and right front brakes 18L, 18R and the left and right rear brakes 20L, 20R. For example, when the pressure Pbx of the pressurized oil is a pressure Pb1, the braking force Fbx becomes a braking force value Fb1. Accordingly, in a case of braking the dump truck 1 by the manual braking operation circuit 11, an operator adjusts the depression operation quantity (operation angle) θbx of the brake pedal 23, thus, making it possible to variably control the braking force Fbx of each of the left and right front brakes 18L, 18R and the left and right rear brakes 20L, 20R.

In this way, in a case of braking the dump truck 1 by the manual braking operation circuit 11, the pressure of the pressurized oil to be outputted from the first brake valves 22F, 22R is controlled in accordance with the depression operation quantity to the brake pedal 23, and this pressurized oil is supplied to the left and right front brakes 18L, 18R and the left and right rear brakes 20L, 20R. As a result, each of the left and right front brakes 18L, 18R and the left and right rear brakes 20L, 20R can generate the braking force in accordance with the depression operation quantity to the brake pedal 23.

Next, an explanation will be made of the automatic driving of automatically driving the dump truck 1 not through an operator.

The dump truck 1 at the automatic driving performs a brake using the automatic brake circuit 24. In this case, a braking force is variably controlled in accordance with a current value of a control signal outputted to each of the electromagnetic proportional solenoid parts 30F1, 30R1 of the second brake valves 30F, 30R from the controller 39. That is, the braking force of each of the left and right front brakes 18L, 18R and the left and right rear brakes 20L, 20R is adjusted in accordance with the pressure of the pressurized oil controlled through the second brake valves 30F, 30R.

As shown in FIG. 3, in a case of switching the directional control valve 31 from the communicating position (a) to the tank position (b) by the control signal from the controller 39, the directional control valve 31 blocks the second brake valves 30F, 30R from the second accumulator 25 to be communicated with the tank line 32. Therefore, the second brake valves 30F, 30R are caused to be communicated with the tank 13 through the tank line 32, and the pressure in each of the front side and rear side second lines 28, 29 is lowered to the tank pressure. At this time, the automatic brake circuit 24 releases the braking forces by the left and right front brakes 18L, 18R and the left and right rear brakes 20L, 20R to enable the dump truck 1 to travel.

Figure 6:
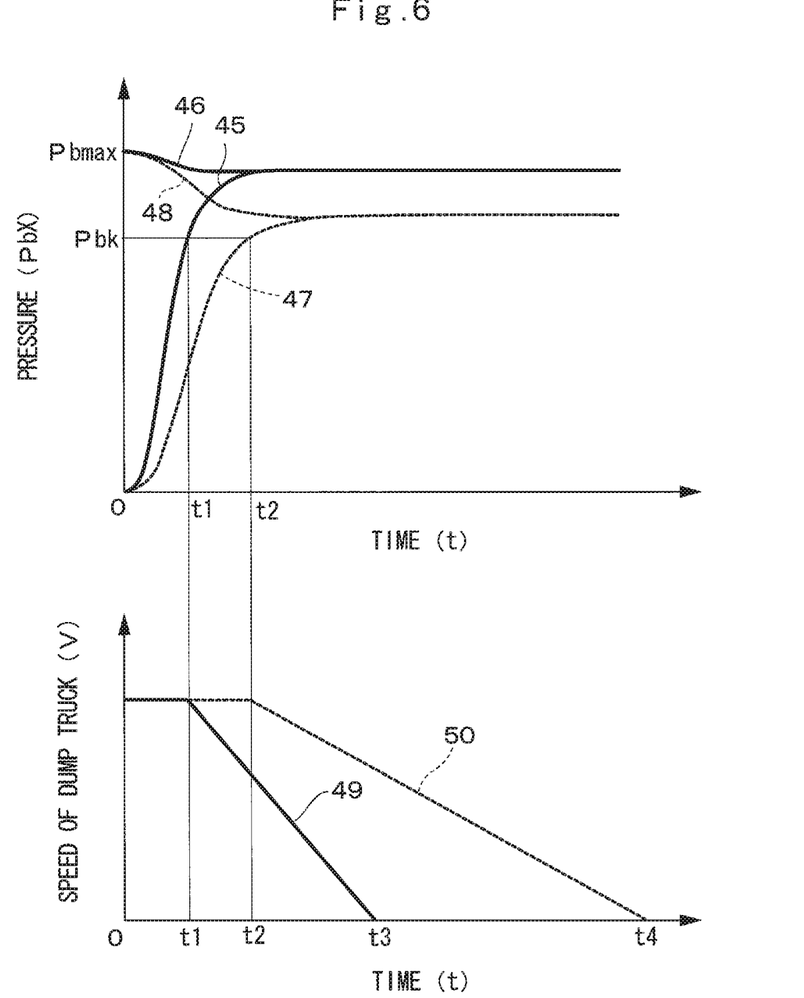
FIG. 6 is a characteristic line diagram showing a pressure of a brake, a pressure of an accumulator, a speed changing characteristic at the braking.

For example, in a state where the directional control valve 31 is switched to the tank position (b), a part of the pressurized oil delivered from the hydraulic pump 12 is accumulated in the second accumulator 25. At this time, the accumulation value (pressure Pbx) of the second accumulator 25 is set to a high pressure value Pbmax as shown in FIG. 6, for example. The pressurized oil delivered from the hydraulic pump 12 is accumulated also in the first accumulators 15F, 15R in the manual braking operation circuit 11, and each accumulation value (pressure Pbx) is set to the high pressure value Pbmax as shown in FIG. 6, for example.

It should be noted that in a case of returning the directional control valve 31 back to the communicating position (a) and controlling the brake pressure by the second brake valves 30F, 30R, a part of the pressurized oil delivered from the hydraulic pump 12 is accumulated in the second accumulator 25. However, accumulation control to the accumulators 15F, 15R, 25 is affected by the delivery quantity control of the hydraulic pump 12 to generate a time lag, making it difficult to improve responsiveness.

That is, the controller 39 drives the regulator 38 based upon the pressure in the pump line 14 detected by the pressure sensor 36, and the delivery quantity of the hydraulic pump 12 is variably controlled by the regulator 38. The delivery quantity of the hydraulic pump 12 generates a response delay in driving the displacement variable part 12A from the minimum tilting position to the maximum tilting position by the regulator 38. Therefore, at the time of increasing the delivery quantity of the hydraulic pump 12 from the minimum flow quantity and increasing the accumulation quantity to the accumulators 15F, 15R, 25 to the above high pressure value Pbmax, for example, the time lag is generated.

Incidentally, in the brake system of the dump truck 1, the manual braking operation circuit 11 and the automatic brake circuit 24 are connected in parallel through the high-pressure selection valves (shuttle valves 33F, 33R). Therefore, the configuration of the brake line arrangement (for example, the first lines 19, 21, the second lines 28, 29, the shuttle valves 33F, 33R and the brake lines 34F, 34R) becomes complicated to increase a pressure loss in the halfway of the line arrangement. As a result, in a case where an operator depresses the brake pedal 23 to generate a braking force by the manual braking operation circuit 11, a large pressure loss is generated to slow a rising speed of the brake pressure.

Therefore, in the first embodiment, the front hydraulic oil resupply device 40F is provided between the front first accumulator 15F in the manual braking operation circuit 11 and the second accumulator 25 in the automatic brake circuit 24. The rear hydraulic oil resupply device 40R is provided between the rear first accumulator 15R in the manual braking operation circuit 11 and the second accumulator 25. The front hydraulic oil resupply device 40F resupplies the pressurized oil (hydraulic oil) accumulated in the second accumulator 25 to the front first accumulator 15F. Therefore, the front hydraulic oil resupply device 40F includes the connecting line 41F establishing connection between the first accumulator 15F and the second accumulator 25, and a resupply control valve 42F configured by a one-way valve allowing the pressurized oil to flow from the second accumulator 25 toward the first accumulator 15F in the connecting line 41F and blocking a reverse flow of the hydraulic oil.

The rear hydraulic oil resupply device 40R includes the connecting line 41R and the resupply control valve 42R for resupplying the pressurized oil accumulated in the second accumulator 25 to the rear first accumulator 15R. The connecting line 41R of the rear hydraulic oil resupply device 40R is provided in parallel with the connecting line 41F to the second accumulator 25 to establish connection between the first accumulator 15R and the second accumulator 25. The resupply control valve 42R is configured by a one-way valve allowing the pressurized oil to flow from the second accumulator 25 toward the first accumulator 15R in the connecting line 41R and blocking a reverse flow of the hydraulic oil.

With this configuration, in a case of operating the manual braking operation circuit 11 with the operation of the brake pedal 23 to perform the brake of the dump truck 1, the pressurized oil can be resupplied from the second accumulator 25 in the automatic brake circuit 24 toward the first accumulators 15F, 15R in the manual braking operation circuit 11 and can substantially increase the capacity of each of the first accumulators 15F, 15R. Therefore, the pressure loss element (for example, the shuttle valves 33F, 33R) added to the line arrangement route of the brake system can suppress the rising speed of the brake pressure at the time of operating the manual braking operation circuit 11 from being slow.

A characteristic line 45 as shown in a solid line in FIG. 6 shows brake pressure characteristics in a case of operating the manual braking operation circuit 11 with the operation of the brake pedal 23 to perform a brake of the dump truck 1. A characteristic line 46 as shown in a solid line likewise shows pressure characteristics of the first accumulators 15F, 15R. On the other hand, a characteristic line 47 as shown in a dotted line shows brake pressure characteristics at the manual operation according to the conventional technology. A characteristic line 48 as shown in a dotted line likewise shows pressure characteristics of an accumulator.

In the first embodiment, the pressurized oil is resupplied from the second accumulator 25 in the automatic brake circuit 24 to the first accumulators 15F, 15R in the manual braking operation circuit 11. Therefore, as the characteristic line 46, it is possible to suppress the accumulation value (accumulator pressure) of each of the first accumulators 15F, 15R from being lowered largely from the high pressure value Pbmax. On the other hand, in the conventional technology, the accumulator pressure (refer to the characteristic line 48 as shown in the dotted line) is largely lowered before and after time t1 following a rise of the brake pressure like the characteristic line 47 as shown in the dotted line. As a result, the rising speed of the brake pressure is slower like the characteristic line 47.

In the first embodiment, however, the pressurized oil is resupplied from the second accumulator 25 to the first accumulators 15F, 15R as described above. Consequently, it is possible to increase the rising speed of the brake pressure by the manual braking operation circuit 11 like the characteristic line 45 as shown in the solid line, and it is possible to suppress the rising speed of the brake pressure from being slower like the characteristic line 47. At this time, the front brakes 18L, 18R and the rear brakes 20L, 20R apply braking forces to the vehicle at the time the pressure Pbx of the brake is increased to a pressure value Pbk at time t1, for example and starts deceleration of the vehicle.

Like a characteristic line 49 as shown in a solid line in FIG. 6, a braking force is applied to the dump truck 1 in the middle of traveling at time t1 to cause gradual deceleration thereof, and the dump truck 1 is stopped at time t3. On the other hand, in a case of the conventional technology (a characteristic line 50 as shown in a dotted line), it is impossible to stop the vehicle until time t4 after the braking force is applied at time t2. Therefore, it is possible to shorten a brake distance by the manual braking operation by a quantity of a time difference (t4−t3).

In addition, in the first embodiment, the pressurized oil (hydraulic oil) is supplied only in one direction from the second accumulator 25 in the automatic brake circuit 24 to the first accumulators 15F, 15R in the manual braking operation circuit 11. Therefore, under a situation where an operator performs a manned driving of the dump truck 1, even in a case where the pressure of the pressurized oil (accumulation value) of the second accumulator 25 is unintendedly lowered by an operator's unintended operation of the automatic brake circuit 24 or reasons such as a failure thereof, it is possible to secure the pressure of the pressurized oil accumulated in the first accumulators 15F, 15R in the manual braking operation circuit 11. Consequently, without damaging the function and reliability of the manual braking operation circuit 11, it is possible to immediately operate the manual braking operation as needed and improve responsiveness at the brake operation.

Figure 7:
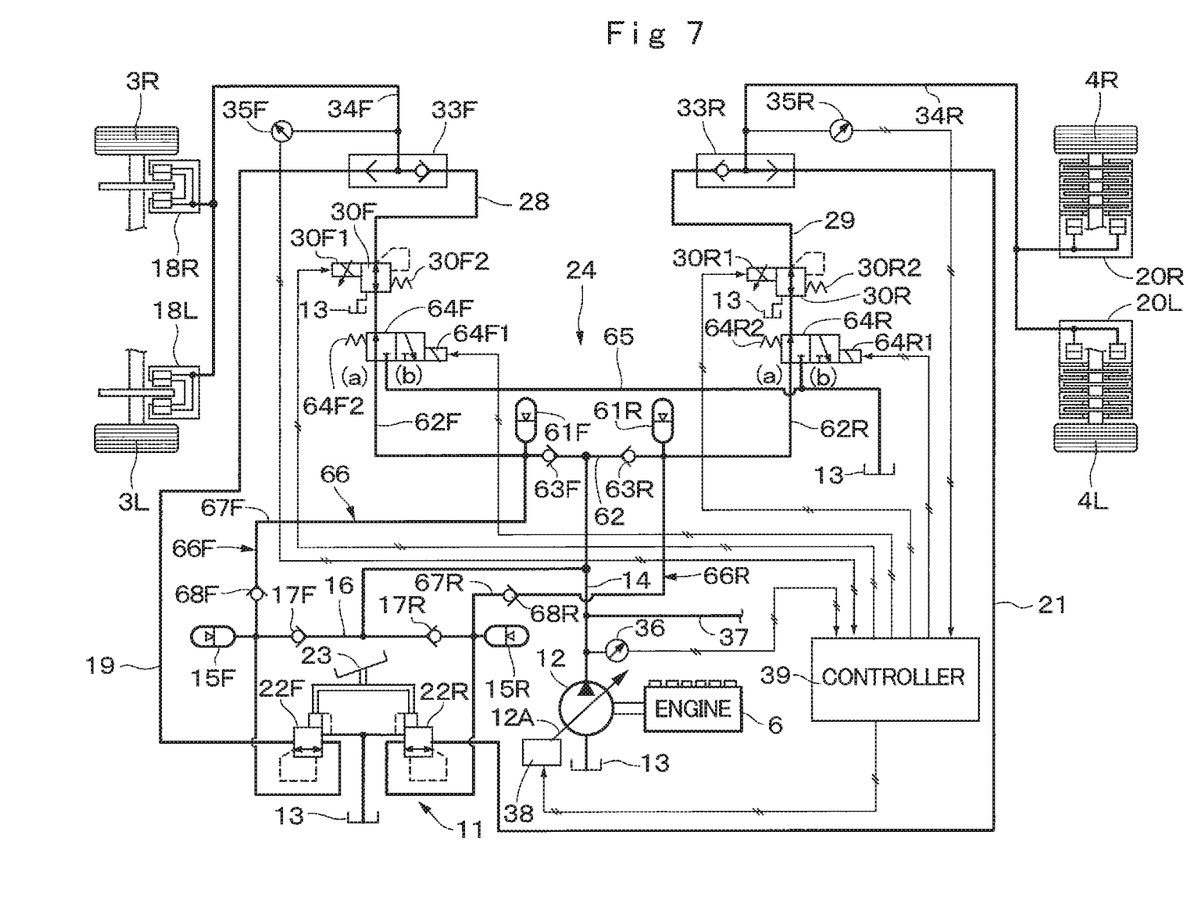
FIG. 7 is a control circuit diagram showing a brake system according to a second embodiment.

Next, FIG. 7 shows a brake system according to a second embodiment. In the present embodiment, components identical to those in the aforementioned first embodiment are referred to as identical reference numerals, and the explanation will be omitted. The second embodiment is characterized in that a front second accumulator 61F, a rear second accumulator 61R, front side and rear side directional control valves 64F, 64R, a front hydraulic oil resupply device 66F and a rear hydraulic oil resupply device 66R are provided in the automatic brake circuit 24.

Here, the front second accumulator 61F and the rear second accumulator 61R (that is, the second accumulators 61F, 61R) are connected in parallel to the pump line 14 through a second accumulator line 62. The front second accumulator 61F accumulates therein the pressurized oil for supply to the left and right front brakes 18L, 18R. The rear second accumulator 61R accumulates therein the pressurized oil for supply to the left and right rear brakes 20L, 20R. The second accumulator line 62 is provided with a check valve 63F allowing a flow of pressurized oil from the hydraulic pump 12 toward the front second accumulator 61F and blocking a reverse flow of the hydraulic oil, and a check valve 63R allowing a flow of pressurized oil from the hydraulic pump 12 toward the rear second accumulator 61R and blocking a reverse flow of the hydraulic oil.

The second accumulator line 62 has a front side line part 62F and a rear side line part 62R at both end sides thereof, which respectively extend to the front side and rear side second brake valves 30F, 30R. In other words, the front side line part 62F is connected to the front side second line 28 through the front side directional control valve 64F, for example, and the rear side line part 62R is connected to the rear side second line 29 through the rear side directional control valve 64R, for example.

The front side directional control valve 64F is positioned between the front side second brake valve 30F and the front second accumulator 61F and is provided in the front side line part 62F. The rear side directional control valve 64R is positioned between the rear side second brake valve 30R and the rear second accumulator 61R and is provided in the rear side line part 62R. The directional control valves 64F, 64R each are configured to be similar to the directional control valve 31 described in the first embodiment, and have solenoid parts 64F1, 64R1 and springs 64F2, 64R2.

The front side directional control valve 64F is regularly disposed in a communicating position (a) by the spring 64F2, and allows the hydraulic oil to flow from the front second accumulator 61F toward the second brake valve 30F in this communicating position (a). When the front side directional control valve 64F is switched from the communicating position (a) to a tank position (b) by a control signal outputted from the controller 39 to the solenoid part 64F1, the front side second brake valve 30F is blocked from the second accumulator 61F to be communicated with the tank 13 through a tank line 65. Therefore, the second brake valve 30F is communicated with the tank 13 through the tank line 65, and the pressure in the front side second line 28 is reduced to a tank pressure.

The rear side directional control valve 64R is regularly disposed in a communicating position (a) by the spring 64R2, and allows the hydraulic oil to flow from the rear second accumulator 61R toward the second brake valve 30R in this communicating position (a). When the rear side directional control valve 64R is switched from the communicating position (a) to a tank position (b) by a control signal outputted from the controller 39 to the solenoid part 64R1, the rear side second brake valve 30R is blocked from the second accumulator 61R to be communicated with the tank 13 through the tank line 65. Therefore, the second brake valve 30R is communicated with the tank 13 through the tank line 65, and the pressure in the rear side second line 29 is reduced to a tank pressure.

A hydraulic oil resupply device 66 is configured by a front hydraulic oil resupply device 66F provided between the front first accumulator 15F in the manual braking operation circuit 11 and the front second accumulator 61F in the automatic brake circuit 24, and a rear hydraulic oil resupply device 66R provided between the rear first accumulator 15R in the manual braking operation circuit 11 and the rear second accumulator 61R in the automatic brake circuit 24. The front hydraulic oil resupply device 66F is configured by a connecting line 67F and a resupply control valve 68F for resupply of the pressurized oil (hydraulic oil) accumulated in the front second accumulator 61F to the front first accumulator 15F.

The connecting line 67F of the front hydraulic oil resupply device 66F is a conduit that establishes connection between the front first accumulator 15F and the front second accumulator 61F. The resupply control valve 68F is a one-way valve that is provided in the halfway of the connecting line 67F, for example. The resupply control valve 68F allows the pressurized oil to flow from the front second accumulator 61F toward the front first accumulator 15F in the connecting line 67F, and blocks a reverse flow of the hydraulic oil.

The rear hydraulic oil resupply device 66R is configured by a connecting line 67R and a resupply control valve 68R for resupply of the pressurized oil accumulated in the rear second accumulator 61R to the rear first accumulator 15R. The connecting line 67R of the rear hydraulic oil resupply device 66R is a conduit that establishes connection between the rear first accumulator 15R and the rear second accumulator 61R. The resupply control valve 68R is a one-way valve that is provided in the halfway of the connecting line 67R, for example. The resupply control valve 68R allows the pressurized oil to flow from the rear second accumulator 61R toward the rear first accumulator 15R in the connecting line 67R, and blocks a reverse flow of the hydraulic oil.

In this way, also in the second embodiment as thus configured, in a case of operating the manual braking operation circuit 11 to perform the brake of the dump truck 1, it is possible to resupply the pressurized oil from the second accumulators 61F, 61R in the automatic brake circuit 24 to the first accumulators 15F, 15R in the manual braking operation circuit 11. Therefore, as similar to the first embodiment, it is possible to enhance a braking capability by the manual braking operation and suppress a brake distance at the brake operation to be small. In addition, it is possible to improve reliability as the brake system.

Particularly according to the second embodiment, the automatic brake circuit 24 is provided with the front second accumulator 61F and the rear second accumulator 61R as pressurized oil supply sources independent with each other to the front brakes 18L, 18R and the rear brakes 20L, 20R. Following this arrangement, the second accumulator line 62 is provided with the check valves 63F, 63R and the directional control valves 64F, 64R to enable the front brakes 18L, 18R and the rear brakes 20L, 20R to operate with independent pressurized oil supply sources (that is, the front second accumulator 61F and the rear second accumulator 61R).

Further, the front hydraulic oil resupply device 66F is provided between the front first accumulator 15F in the manual braking operation circuit 11 and the front second accumulator 61F in the automatic brake circuit 24, and the rear hydraulic oil resupply device 66R is provided between the rear first accumulator 15R in the manual braking operation circuit 11 and the rear second accumulator 61R in the automatic brake circuit 24.

Consequently, the front hydraulic oil resupply device 66F can supply the pressurized oil only to the front brakes 18L, 18R from the front first accumulator 15F. The rear hydraulic oil resupply device 66R can supply the pressurized oil only to the rear brakes 20L, 20R from the rear first accumulator 15R. Therefore, it is possible to enhance the independence between the circuit of the front brakes 18L, 18R and the circuit of the rear brakes 20L, 20R and increase the reliability of the brake system.

In addition, due to a failure or the like of equipment devices associated with the operations of the front brakes 18L, 18R (for example, any one of the front first accumulator 15F, the front side first brake valve 22F, the front side second brake valve 30F and the directional control valve 64F), the accumulation value (pressure of the hydraulic oil) of the front second accumulator 61F is assumed to be low. Even in a case where such a situation occurs, however, the accumulation value (pressure of the pressurized oil) of the rear second accumulator 61R does not lower. Therefore, by controlling to switch the rear side second brake valve 30R or the directional control valve 64R to communicating position in response to a control signal from the controller 39, the rear brakes 20L, 20R are caused to operate, making it possible to secure the braking force of the vehicle.

In addition, in a case of operating the rear brakes 20L, 20R by the manual braking operation (that is, an operation of the brake pedal 23), it is possible to increase the rising speed of the brake force of each of the rear brakes 20L, 20R by the rear hydraulic oil resupply device 66R. Consequently, it is possible to shorten the time until the braking force of each of the rear brakes 20L, 20R increases and prevent the brake distance of the dump truck 1 from being longer.

On the other hand, even in a case where there occurs a situation where equipment devices associated with the operations of the rear brakes 20L, 20R are in failure, the accumulation value (pressure of the pressurized oil) of the front second accumulator 61F does not lower. Therefore, it is possible to operate the front brakes 18L, 18R by controlling to switch the front side second brake valve 30F or the directional control valve 64F to the communicating position by the control signal from the controller 39, and the front brakes 18L, 18R are operated by the brake pedal 23, making it possible to secure the braking force of the vehicle.

It should be noted that the first embodiment is explained by taking a case where the resupply control valves 42F, 42R in the hydraulic oil resupply device 40 each are configured with the one-way valve such as the check valve. However, the present invention is not limited thereto, but, for example, a hydraulic oil resupply device is only required to resupply the pressurized oil (hydraulic oil) accumulated in the second accumulator 25 and block a reverse flow of the hydraulic oil, and may be optionally configured based thereupon. This point is similar to the second embodiment as well.

Each of the embodiments is explained by taking the brake system applied to the dump truck 1 provided with the left and right front brakes 18L, 18R and the left and right rear brakes 20L, 20R, as an example. However, the present invention is not limited thereto, but may be applied to a working vehicle such as a wheel loader and a fork lift enabling an automatic driving, as a brake system.

In addition, the brake operating pressure of the pressurized oil to be supplied to the front brakes 18L, 18R each and the brake operating pressure of the pressurized oil to be supplied to the rear brakes 20L, 20R each are not necessarily the same pressure value, and braking forces may be generated in front wheels and in rear wheels by brake operating pressures (threshold values) different to each other. Further, an operating pressure of each of the brakes may be optionally changed by the structure of a brake device, the configuration of a conduit (conduit length) connected to the brake device or the like.

DESCRIPTION OF REFERENCE NUMERALS

1: Dump truck (Vehicle)
2: Vehicle chassis
6: Engine
11: Manual braking operation circuit
12: Hydraulic pump
15F: Front first accumulator
15R: Rear first accumulator
18L, 18R: Front brake (Brake device)
19: Front side first line (First line)
20L, 20R: Rear brake (Brake device)
21: Rear side first line (First line)
22F, 22R: First brake valve
23: Brake pedal
24: Automatic brake circuit
25: Second accumulator
28: Front side second line (Second line)
29: Rear side second line (Second line)
30F, 30R: Second brake valve
31, 64F, 64R: Control switching valve
33F, 33R: Shuttle valve (Brake pressure selection device)
38: Regulator
39: Controller (Control device)
40, 66: Hydraulic oil resupply device
40F, 66F: Front hydraulic oil resupply device
40R, 66R: Rear hydraulic oil resupply device
41F, 41R, 67F, 67R: Connecting line
42F, 42R, 68F, 68R: Resupply control valve
61F: Front second accumulator
61R: Rear second accumulator

The invention claimed is:

1. A vehicular brake system comprising:
a hydraulic pump that is driven by an engine mounted on a vehicle chassis of an automotive vehicle to deliver hydraulic oil;
a plurality of brake devices that apply braking forces to the vehicle chassis by the delivery of the hydraulic oil;
a manual braking operation circuit in which an operator performs an operation of the plurality of brake devices; and
an automatic brake circuit in which the operation of the plurality of brake devices is performed not through the operator, during automatic driving of the vehicle,
the manual braking operation circuit including:
at least one first accumulator that accumulates the hydraulic oil to be delivered from the hydraulic pump; and
at least one first brake valve that controls supply or discharge of the hydraulic oil toward each of the brake devices from the at least one first accumulator by a pedal operation,
the automatic brake circuit including:
at least one second accumulator that accumulates the hydraulic oil to be delivered from the hydraulic pump;
at least one second brake valve that controls supply or discharge of the hydraulic oil toward each of the brake devices from the at least one second accumulator;
a control device that controls an operation of the second brake valve; and
at least one brake pressure selection device that selects hydraulic oil higher in pressure out of the hydraulic oils to be supplied from the first brake valve and the second brake valve and outputs the higher hydraulic oil to each of the brake device,
wherein the at least one first accumulator in the manual braking operation circuit and the at least one second accumulator in the automatic brake circuit are connected in parallel to the hydraulic pump,
wherein at least one hydraulic oil resupply device is provided between the at least one first accumulator in the manual braking operation circuit and the at least one second accumulator in the automatic brake circuit, and
wherein the hydraulic oil resupply device resupplies the hydraulic oil accumulated in the at least one second accumulator to the at least one first accumulator.

2. The vehicular brake system according to claim 1, wherein
the automatic brake circuit is provided with a directional control valve that is provided between the at least one second accumulator and the second brake valve, and is regularly in a communicating position to allow the hydraulic oil to flow from the at least one second accumulator toward the second brake valve, and at the time of being switched from the communicating position to a tank position by the controller, blocks the second brake valve from the at least one second accumulator to be communicated with a tank.

3. The vehicular brake system according to claim 1, wherein
the hydraulic oil resupply device includes at least one connecting line that is provided to be connected to and between the at least one first accumulator and the at least one second accumulator, and a one-way resupply control valve that is provided in the connecting line and allows the hydraulic oil to flow from the at least one second accumulator toward the at least one first accumulator and blocks a reverse flow of the hydraulic oil.

4. The vehicular brake system according to claim 1, wherein
the plurality of brake devices includes a front brake provided in a front wheel side of the vehicle, and a rear brake provided in a rear wheel side of the vehicle,
the at least one first accumulator includes a front first accumulator that is connected to the hydraulic pump and supplies the hydraulic oil to the front brake, and a rear first accumulator that supplies the hydraulic oil to the rear brake, and
the hydraulic oil resupply device includes a front hydraulic oil resupply device provided between the front first accumulator and the at least one second accumulator, and a rear hydraulic oil resupply device provided between the rear first accumulator and the at least one second accumulator.

5. The vehicular brake system according to claim 1, wherein
the plurality of brake devices includes a front brake provided in a front wheel side of the vehicle, and a rear brake provided in a rear wheel side of the vehicle,
the at least one first accumulator includes a front first accumulator that is connected to the hydraulic pump and supplies the hydraulic oil to the front brake, and a rear first accumulator that supplies the hydraulic oil to the rear brake,
the at least one second accumulator includes a front second accumulator that is connected to the hydraulic pump and supplies the hydraulic oil to the front brake, and a rear second accumulator that supplies the hydraulic oil to the rear brake, and the hydraulic oil resupply device includes a front hydraulic oil resupply device provided between the front first accumulator and the front second accumulator, and a rear hydraulic oil resupply device provided between the rear first accumulator and the rear second accumulator.

\* \* \* \* \*